(No Model.)
E. KIDWELL.
COMPRESSION MICROMETER FOR TESTING MACHINES.
No. 575,651. Patented Jan. 19, 1897.
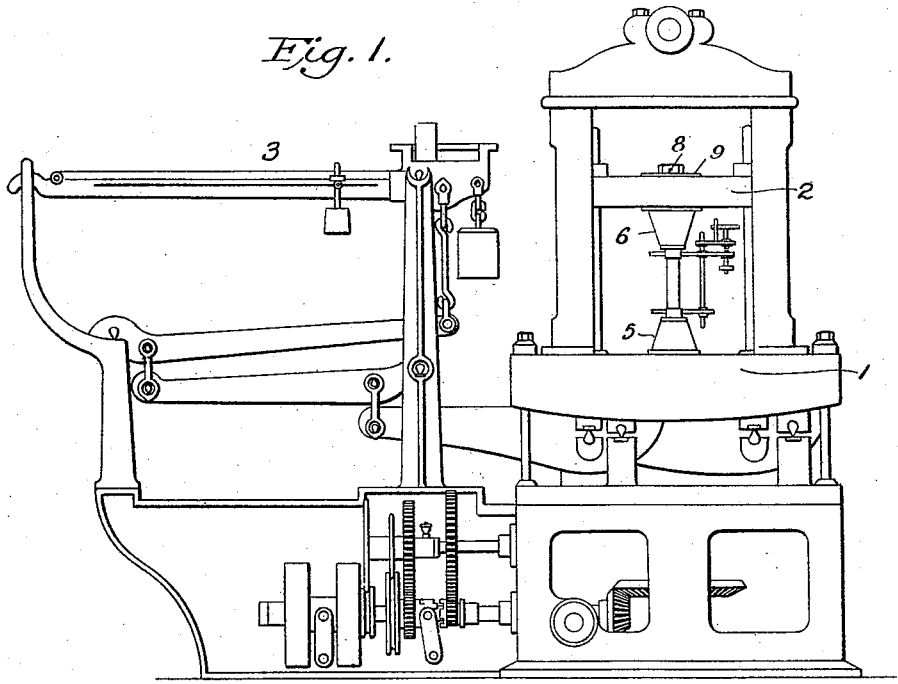
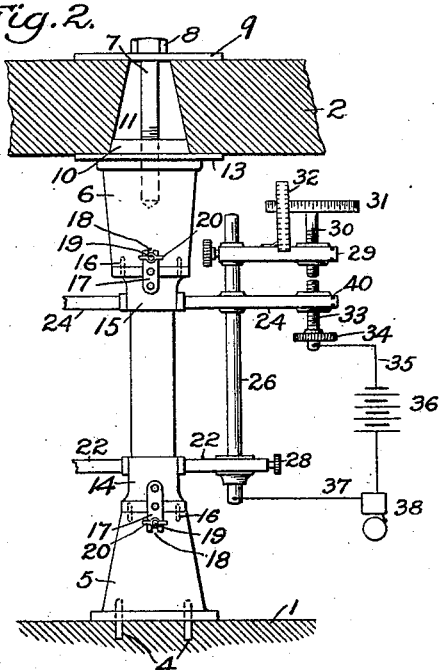
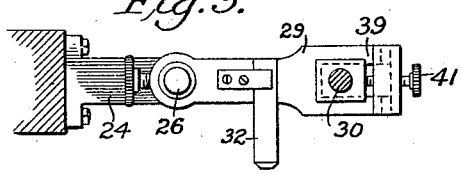
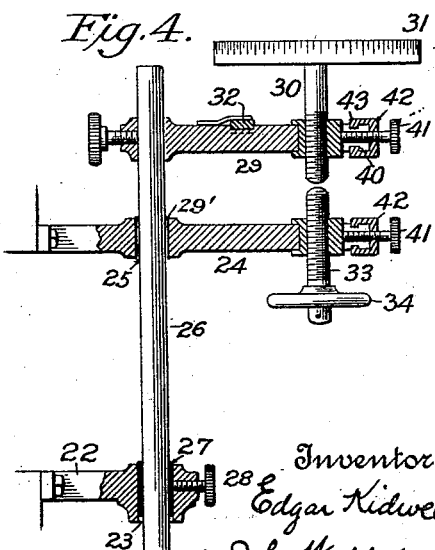
Witnesses
James T. Duhamel
K. A. Nau
Inventor,
Edgar Kidwell,
by John Wedderburn
Attorney

UNITED STATES PATENT OFFICE.

EDGAR KIDWELL, OF HOUGHTON, MICHIGAN.

COMPRESSION-MICROMETER FOR TESTING-MACHINES.

SPECIFICATION forming part of Letters Patent No. 575,651, dated January 19, 1897.

Application filed June 19, 1896. Serial No. 596,149. (No model.)

*To all whom it may concern:*

Be it known that I, EDGAR KIDWELL, a citizen of the United States, residing at Houghton, in the county of Houghton and State of Michigan, have invented certain new and useful Improvements in Compression-Micrometers; and I do hereby declare the following to be a full, clear, and exact description of the invention, such as will enable others skilled in the art to which it appertains to make and use the same.

My invention relates to improvements in compression-micrometers, the object of the same being to provide an instrument to be used as an attachment or adjunct to a testing-machine, whereby the shortening of the specimen under test may be observed and noted as the load or stress on the same increases.

The invention consists of a testing-machine adapted to indicate the stress or power exerted upon the specimen under test, and a micrometer attachment secured to the main platform and to the draw-head of said machine, the same being made up of a pair of blocks detachably secured to said platform and draw-head, respectively, laterally-extending arms on each side of said blocks, vertical rods or shafts adjustably secured in the lower of said arms and slidingly connected with the upper, supplemental arms adjustably secured to said rods or shafts, a micrometer-screw in the outer end of each of said supplemental arms, a divided head upon each of said micrometer-screws, scale-bars acting in engagement with said divided heads, an electric battery and bell in circuit therewith, and connections between said battery and the moving parts of said device, whereby the circuit is closed through said bell, when the micrometer is set at its zero-point, to take readings.

The invention also consists in other details of construction and combinations of parts, which will be hereinafter more fully described and claimed.

In the accompanying drawings, forming part of this specification, Figure 1 represents a side elevation of a well-known Riehle screw-power testing-machine with my attachment applied thereto. Fig. 2 is a vertical sectional view through the draw-head and platform of said testing-machine, showing the means of attaching my micrometer. Fig. 3 is a detail plan view of one of the arms attached to the upper block on the movable draw-head, and Fig. 4 is a sectional view through the same.

Like reference-numerals indicate like parts in the different views.

I have illustrated my improvements in connection with the well-known Riehle screw-power testing-machine, but it is obvious that it can be applied to any testing-machine of the same character now in use.

In Fig. 1 the platform 1 has slidingly mounted above it a draw-head 2, and suitable connections are provided between the same and the scale-beam 3, whereby the stress exerted upon the specimen operated upon may be indicated. To the platform 1 is secured upon dowel-pins 4 4 a block 5, preferably in the shape of a frustum of a cone. Also secured to the under side of the draw-head 2 is a similar block 6, which is held in place by a bolt 7, passing through said draw-head and having a tightening-nut 8 upon its upper end, which engages a plate 9 upon the upper surface of said draw-head. A wedge-shaped extension 10 may be formed upon the upper end of the block 6, which fits within a corresponding recess 11 in the under side of the draw-head 2 to prevent lateral displacement of said block, a flange or shoulder 13 being provided which bears against the main portion of said draw-head on its under side. Secured to the upper and lower ends of the respective blocks 5 and 6 are pressure-blocks 14 and 15, the same being connected by dowel-pins 16 and straps 17 17, permanently secured to the pressure-blocks 14 and 15 and having yoked or bifurcated outer ends 18, which embrace threaded studs 19 upon the blocks 5 and 6. Thumb-screws 20 fit upon said threaded studs to complete the connection between said pressure-blocks and the blocks 5 and 6, to which they are respectively connected.

Bolted or otherwise secured to the pressure-block 14 are laterally-extending arms 22 22, having openings 23 near their outer ends, and similarly secured to the pressure-block 15 are similar laterally-extending arms 24 24, provided with similar openings 25 25. Fitting the openings 23 and 25 in the respective arms 22 and 24 is a vertically-disposed rod 26, the same passing through a bushing 27 in the openings 23 and adjustably secured in place by set-screws 28. An insulating-bushing 29' is secured in the openings 25 in the arms 24, through which the rod 26 passes for a purpose which will hereinafter appear.

Adjustably secured to the upper end of the rod 26 is an arm 29, having a micrometer-screw 30 in its outer end, to which is connected a divided head 31, acting in engagement with a scale-bar 32, secured to the arm 29. In the outer end of the arm 24, just beneath the micrometer-screw 30, is a thumb-screw 33, having a milled head 34, by means of which it may be readily turned to adjust the position of its upper end. A wire 35 connects the lower ends of the screw 33 with a battery 36, and a similar wire 37 leads from the battery to the lower end of the rod 26 or to any other part of the framework to which the arm 22 is connected. An electric bell 38 is interposed between the battery and the rod 26, with which the circuit-wire 37 connects.

In using my device the specimen to be tested is inserted between the pressure-blocks 14 and 15 and the draw-head 2 drawn downwardly until the lower end thereof is in contact with the upper end of said specimen and the scale-beam 3 lies in a balanced position. The arm 29 is then moved downwardly upon the rod 26 until the lower end of the micrometer-screw 30 is brought into contact with the upper end of the set-screw 33, at which time the circuit is closed through the battery 36, wire 37, bell 38, rod 26, arm 24, set-screw 33, and wire 35, back to the battery, ringing the bell 38 and indicating that the parts are in contact one with the other. At the same time or before the arm 29 is adjusted the micrometer-screw 30 is adjusted so that the head 31 thereon lies at the zero-point on the scale-bar 32. Pressure is then applied, drawing down the draw-head 3 and compressing the specimen between the pressure-blocks 14 and 15. The stress or compression upon the specimen will be indicated at all times by the scale-beam 3, and when it is desired to determine what the shortening of the specimen has been under any stress the micrometer-screw 30 is screwed downwardly until it is brought into contact with the upper end of the screw 33, the proper contact being determined or indicated by the ringing of the bell 38. The readings upon the scale-bar 32 will indicate the shortening of the specimen. As the scale-bar and the parts connected therewith are arranged in pairs on opposite sides of the pressure-block 15, the mean shortening of the specimen may be determined by taking the average of the readings on the scale-bars.

In testing rock or similar material it may be found desirable to locate the arm 29, with the micrometer-screw 30 and scale-bar 32, attached thereto, and the set-screw 33, on opposite sides of the arm 24. This may be effected by forming the arms 24 and 29 with bifurcated or yoked outer ends 39 39 and providing the same with lateral grooves or recesses 40 40 on the upper and lower surfaces thereof. The bifurcated ends 39 of the boxes in which the screws 33 and 30 move are then clamped in place by means of set-screws 41 41, passing through a U-shaped clip 42, having inwardly-extending flanges 43 upon its ends, which fit within the recesses 40 40, as clearly shown in Figs. 3 and 4. By this construction the position of the screws 30 and 33 may be reversed, placing the graduated scale-bar 32 on the under side of the arm 34.

From the foregoing description it will be seen that I have provided means whereby the amount of shortening of the test specimen may be indicated at any time with any degree of stress or compression that is applied to the specimen and a complete history of the action of the specimen recorded. This is effected without the use of joints, levers, belts, pulleys, or cog-wheels, in which lost motion always occurs.

Having now described my invention, what I claim as new, and desire to secure by Letters Patent, is—

1. The combination with a testing-machine having a stationary platform, a movable draw-head, and means for indicating the stress or compression exerted upon the specimen operated upon, of a pair of blocks attached respectively to said platform and said draw-head, laterally-extending arms on said blocks, a vertically-disposed rod adjustably secured in the lower of said arms and slidingly connected with, but electrically insulated from the other of said arms, a lateral arm adjustably secured to the upper ends of said rod, a micrometer-screw in the outer end thereof having a graduated head acting in engagement with a graduated scale-bar, a set-screw in the outer end of the arm secured to the upper of said blocks, located just beneath said micrometer-screw, an electric battery, a bell, and circuit-wires connecting the screw located beneath said micrometer and a stationary part of the framework of said testing-machine, substantially as and for the purpose described.

2. The combination with a testing-machine having a stationary platform, a movable draw-head, and means for indicating the stress or compression exerted upon the specimen operated upon, of a pair of blocks attached respectively to said platform and draw-head, pressure-blocks secured to the adjacent ends thereof, arms extending downwardly in opposite directions from each of said pressure-blocks, vertically-disposed rods adjustably secured in the lower of said arms by set-screws passing through the outer ends of said arms and engaging the boxes through which said rods pass, the said rods being slidingly connected with, but insulated from the upper pair of said arms, laterally-extending arms secured to both of said rods and adjustable thereon, micrometer-screws in the outer ends thereof having divided heads which act in engagement with graduated scale-bars, set-screws in the outer ends of the arms attached to the upper of said pressure-blocks and located directly beneath said micrometer-screws, an electric battery, a bell, and connections between said battery and said rods and screws, whereby upon the contact of the lower ends of the micrometer-screws with the upper ends of said set-screws the circuits will be closed and the bell actuated, substantially as and for the purpose described.

3. The combination with an arm, of a rod slidingly connected therewith, an arm adjustably secured to said rod, the outer ends of said arms being bifurcated and formed with grooves or recesses upon their upper and lower surfaces, boxes fitting between the bifurcated ends of said arms, clips surrounding the ends thereof and having inturned flanges adapted to fit within the recesses in said arms, a set-screw in the outer end of one of said arms, and a micrometer-screw in the outer end of the other of said arms, whereby said set-screw and said micrometer-screw may be released, substantially as and for the purpose described.

In testimony whereof I have signed this specification in the presence of two subscribing witnesses.

EDGAR KIDWELL.

Witnesses:
 GEORGE HASS,
 CARLTON F. MOORE.